United States Patent
Kass

(10) Patent No.: US 8,060,788 B2
(45) Date of Patent: Nov. 15, 2011

(54) REAL-TIME SIGNAL HANDLING IN GUEST AND HOST OPERATING SYSTEMS

(75) Inventor: Eric Kass, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 12/625,949

(22) Filed: Nov. 25, 2009

(65) Prior Publication Data

US 2010/0138685 A1    Jun. 3, 2010

(51) Int. Cl.
*G06F 11/00* (2006.01)
(52) U.S. Cl. .................................................. 714/38.1
(58) Field of Classification Search .............. 714/23–26, 714/28, 32, 35, 38.1, 38, 13, 39, 48
See application file for complete search history.

(56) References Cited

U.S. PATENT DOCUMENTS

| | | | | |
|---|---|---|---|---|
| 6,961,865 B1 * | 11/2005 | Ganesh et al. | ..................... | 714/2 |
| 7,257,516 B2 * | 8/2007 | Arora et al. | .................... | 702/186 |
| 7,716,521 B1 * | 5/2010 | Donahue et al. | ................. | 714/11 |
| 7,721,148 B2 * | 5/2010 | Brenden et al. | ................. | 714/11 |
| 7,765,547 B2 * | 7/2010 | Cismas et al. | ................. | 718/100 |
| 7,870,443 B2 * | 1/2011 | Munjal et al. | ................... | 714/48 |
| 2008/0282111 A1 * | 11/2008 | Li et al. | ........................... | 714/38 |

OTHER PUBLICATIONS

IBM, System i, Programming i5/OS PASE, Version 6 Release 1, 2000.
Martin McCarthy, Thread-Specific Data and Signal Handling in Multi-Threaded Applications, 1997, http://www.linuxjournal.com/article/2121.
International Preliminary Examination Report on Patentability for PCT Application No. PCT/EP2009/063390 dated Jun. 9, 2011.
Huaidong Shi et al., Interrupt Synchronization Lock for Real-Tim Operating Systems, The Sixth IEEE International Conference on Computer and Information Technology, Sep. 1, 2006.

* cited by examiner

*Primary Examiner* — Nadeem Iqbal
(74) *Attorney, Agent, or Firm* — Hamilton & Terrile, LLP; Stephen A. Terrile

(57) ABSTRACT

The present invention relates to signal handling in a host operating system process executing code portions of a single- or multi-threaded application and of the embedded guest operating system. When a signal is sent from the host operating system to the operating system process, the signal handler of the guest operating system will be invoked in a deterministic time, independent of the operating system process executing code portions of the application or of the guest operating system or executing system calls of the host operating system in a masked or non-masked operation.

14 Claims, 10 Drawing Sheets

REAL-TIME SIGNAL HANDLING IN GUEST AND HOST OPERATING SYSTEMS

BACKGROUND

1. Technical Field

The present invention relates to a method of signal handling in a computer system, a computer system for executing the method, and a computer program product containing code portions to execute the method.

2. Description of the Related Art

The IBM® Power® System (System i® model) runs the IBM i5/OS® host operating system, which manages multiple i5/OS operating system processes. An operating system process is program code in execution including a set of resources, such as pending signals, an address space, a data section containing global variables, and one or more threads of execution. Threads of execution, often shortened to threads, are the objects of activity within the process. The first thread in the process is referred to as the initial or primary thread. Some processes are capable of supporting additional threads, which are called secondary threads. Processes that allow more than one thread of execution are called multi-threaded in contrast with single-threaded processes.

The IBM® i5/OS® Portable Application Solutions Environment (i5/OS PASE) is based on the i5/OS host operating system and is able to execute system code portions of the IBM operating system AIX® (Advanced Interactive eXecutive) natively within the i5/OS operating system process. The AIX operating system is a UNIX derivative targeting high performing server systems. Since the AIX operating system is embedded in the i5/OS host operating system, it is defined as PASE (AIX) guest operating system. The invocation stack of a specific thread of the host operating system process running instructions of the guest operating system shows stack frames pointing to code portions of both the host operating system and the guest operating system.

The Integrated Language Environment (ILE) architecture of the i5/OS operating system provides a set of application programming interfaces (APIs) known as ILE Common Execution Environment (CEE) APIs useful for mixed-language applications because they are independent of high-level languages.

In the case of the i5/OS host operating system, a database system, named DB2 for i5/OS, is integrated in the i5/OS host operating system. The i5/OS host operating system including the database system and the embedded guest operating system PASE(AIX) are installed on one computer system host, for example IBM® Power® System. To perform a database operation on the built-in database, an application programmer or a user can issue a system call of the i5/OS host operating system by way of the ILE application programming interface. This database operation is blocking the host operating system process until the database operation has been completed.

The database system may also reside on a remote system host, which can have an arbitrary operating system. Since the local system host and the remote system host are connected by means of a network, the database access is a socket I/O operation. Since the client and server component of the database driver are installed on different hosts, the system call is not blocking and can be interrupted on the client side while the database operation on the server side is still being executed.

In an operating system, signals are used to notify a process or thread of a particular asynchronous event. The signals are often described as software interrupts. Asynchronous signals are a means of communication between concurrent processes or between multiple threads within a single process. When a specific signal is sent to a process or thread, the process or thread catches the signal and executes code portions of the application dedicated to handling the signal. These code portions are also called signal handler. The signal handling depends on the disposition of the signal, which may be characterized by a signal number. The handling of the signal in an operating system is similar to a hardware system entering an interrupt handler as the result of receiving an interrupt.

Signals generated by some action attributable to a particular thread are sent to the thread that caused the signal to be generated. Signals generated in association with a process ID, a process group ID, or an asynchronous event, such as a terminal activity, are sent to the process. The POSIX compliant subroutine pthread_kill( ) sends a signal to a thread. Because thread IDs identify threads within a process, this subroutine can only send signals to threads within the same process. The POSIX compliant subroutine kill( ) and thus the kill command, sends a signal to a process. Signals to processes can be sent from another process or the destination process itself.

Multi-threaded computer program applications can provide real-time signal handling in a single operating system environment. A common way of handling asynchronous signals in a multi-threaded program is to mask signals in all the threads of an operating system process, and then create at least one separate thread in the same process whose sole purpose is to wait for signals, to catch, and to handle them.

Signal masks are maintained at thread level. When the operating system processes a signal destined for a specific thread and the thread is masked to this type of the signal, the operating system does not forward the signal. When the signal is sent to a specific process and all threads of the process are masked to this type of the signal, the signal will not be delivered either. When more than one thread are not masked to this type of the signal, one of these threads will catch the signal and invoke signal handling. Each thread can have its own set of signals which can be masked and will be blocked from delivery to the thread. The POSIX compliant subroutine pthread_sigmask( ) is used to get and set the calling thread's signal mask.

Signal handlers are maintained at process level. This means that all threads of a process would run the same instructions when a signal is sent to any of the threads. As mentioned here above, programs might create a dedicated thread to wait for asynchronously generated signals. The POSIX compliant subroutine sigwait( ) blocks the calling thread until one of the awaited signals is sent to the process or to the thread.

The operating system allows explicit communication between threads by means of sending signals, and implicit communication through the modification of shared data. To protect data or other resources from concurrent access by multiple threads at any point of time, the operating system may provide a set of synchronization objects, such as mutex, condition variable, read/write lock, or join. A mutex is a mutual exclusion lock. Only one thread can acquire and hold the lock at one point of time, and only the owner of this thread is able to release the mutex so that the same or another thread can acquire it again.

Signal processing becomes intricate in the i5/OS PASE environment because the i5/OS host operating system process is on one hand executing code portions of the application or of the PASE (AIX) guest operating system and on the other hand performing system calls of the host operating system. The operating system process executes code portions of the guest operating system when the application issues system calls of the guest operating system.

When a signal is sent from the guest operating system to the operating system process, i.e., by executing a system call of the guest operating system, then the process catches the signal and invokes the signal handler of the guest operating system. When a signal is sent from the host operating system to the operating system process, i.e., by executing a system call of the host operating system, the process also catches the signal and invokes the signal handler of the host operating system.

The prior art implementation of the PASE (AIX) guest operating system embedded in the i5/OS host operating system allows to set an i5/OS environment variable QIBM_PASE_MAP_SIGNALS to a specific value (uppercase character "I") so that the default signal handler of the i5/OS host operating system maps a signal, which the process caught from the host operating system, to the guest operating system, i.e., the signal handler of the host operating system invokes the signal handler of the guest operating system, immediately, even though the thread of the process that caught the signal, may be masked to signals from the guest operating system.

When a specific thread of the operating system process invokes a system call of the i5/OS host operating system for a non-masked operation, for example, a socket I/O operation, the process can catch a specific signal from the host operating system and the thread that caught the signal executes the default signal handler of the host operating system. If the i5/OS environment variable QIBM_PASE_MAP_SIGNALS is set to the specific value, the default signal handler maps the signal from the host operating system to the guest operating system and the guest operating system forces the thread to execute the signal handler of the guest operating system.

When the specific thread executes a system call of the host operating system to perform a native masked operation, for example, a database request to the integrated database system, the thread is masked to signals from the host operating system. In this case, the thread cannot catch a signal from the host operating system and invoke the default signal handler of the host operating system. The signal will be pending until the host operating system process becomes unmasked, i.e., after the database operation has completed. Then the signal may be processed by the signal handler of the host operating system and possibly by the signal handler of the guest operating system depending on the environment variable QIBM_PASE_MAP_SIGNALS. This means that the host operating system process would not be able to handle the caught signal, which the host operating system sent to the operating system process, in a deterministic response time.

When a specific thread of the i5/OS host operating system process is executing a system call of the host operating system by way of the ILE API, the thread may be masked to signals from the guest operating system. When the thread catches a signal from the guest operating system, the signal is held pending until the thread unmasks itself to signals from the guest operating system. Unfortunately, the handling of the caught signal, which the guest operating system sent to the operating system process, will also be delayed in time.

The semantics of the business application SAP® R/3® and mySAP.com®, which is running in the i5/OS PASE operating system, is single-threaded. This means that an operating system process of the application must not have more than one thread executing application code portions and performing system calls of the guest operating system at any given point of time.

The requirement of single-threaded application execution in a multi-threaded operating system complicates a possible solution to the problem of partly immediate and partly delayed signal delivery described in the sections above.

OBJECTIVES OF THE INVENTION

It is thus an objective of the present invention to provide a method and a system for signal handling in a host operating system having an operating system process executing code portions of both the application and the embedded guest operating system in at most one thread of the process at any given point of time. When a signal is sent from the host operating system to the operating system process, the signal handler of the guest operating system should be invoked in a deterministic time, which should be independent of the operating system process executing system calls of the host operating system in a masked operation, or system calls of the host operating system in a non-masked operation, or application code portions, or system calls of the guest operating system.

Furthermore, the objective of the invention is to support also multi-threaded applications.

SUMMARY

This objective of the present invention is achieved by a method and a system for signal handling in a host operating system, which contains at least one operating system process. The operating system process is executing application code portions and guest operating system code portions. The application code portions invoke the guest operating system code portions by system calls of the guest operating system, which is embedded in the host operating system. Furthermore, the operating system process is able to execute system calls of the host operating system. The operating system process has a worker thread dedicated to executing the application code portions. When the worker thread is started, the worker thread creates an associated signal-waiter thread dedicated to handling specific signals from the host operating system and the worker thread is masked to signals sent from the host operating system to the operating system process. The mask of the worker thread to signals from the host operating system prevents the interruption of the flow of execution of the worker thread.

The method of the present invention comprises the following steps: Firstly, the signal-waiter thread catches a specific signal from the host operating system. Secondly, the present invention distinguishes two cases: Case A when the worker thread is executing a system call of the host operating system and case B when the worker thread is not executing a system call of the host operating system.

In case A, while the worker thread is executing a system call of the host operating system, in response to the specific caught signal from the host operating system, the signal-waiter thread protects the worker thread from executing application code portions and system calls of the guest operating system. The signal-waiter thread executes code portions for handling signals from the guest operating system adapted to the specific signal from the host operating system. After the signal-waiter thread has finished handling the specific signal, it allows the worker thread to execute application code portions and system calls of the guest operating system.

In one preferred embodiment of the present invention, the worker thread performs error handling when the signal-waiter thread ended abnormally and does not allow the worker thread to execute application code portions and system calls of the guest operating system. The error handling performed by the worker thread may consist of terminating the operating system process, because the ended signal-waiter thread would block the worker thread from ever executing code portions of the application or of the guest operating system.

While the worker thread is executing a system call of the host operating system, the worker thread may also be masked to signals from the guest operating system.

The lock mechanism between the worker thread and the signal-waiter thread is implemented by means of a specific mutual exclusion (mutex) lock. The signal-waiter thread protects the worker thread from executing application code portions and system calls of the guest operating system by acquiring the specific mutex lock. When the signal-waiter thread has acquired the mutex lock and the worker thread requests to acquire the same mutex lock, the worker thread will wait until the signal-waiter thread has released the mutex lock. After the signal-waiter thread has finished signal handling in the guest operating system, the signal-waiter thread allows the worker thread to execute application code portions and system calls of the guest operating system by releasing the specific mutex lock. The error handling performed by the worker thread is triggered when the worker thread fails to acquire the mutex lock because the signal-waiter thread has ended abnormally while owning the mutex lock.

In case B, the worker thread is not executing a system call of the host operating system. This means that the worker thread is executing application code portions or guest operating system code portions. In this case, the worker thread is not masked to signals from the guest operating system. In response to the specific caught signal from the host operating system, the signal-waiter thread invokes the worker thread to execute code portions for handling signals from the guest operating system adapted to the specific signal from the host operating system.

In the preferred embodiment of the present invention, for both cases A and B, when a second operating system process is executing a system call of the guest operating system to send a signal to the first operating system process, then the guest operating system is executing a system call of the host operating system to send the specific signal, which is adapted to the signal from the second operating system process, to the first operating system process.

In the preferred embodiment of the present invention, the system call of the host operating system is performing a database operation.

Thus, the present invention advantageously adds real-time signal handling to the prior art by allowing signals from the i5/OS host operating system to pass to the PASE (AIX) guest operating system even while the primary thread is executing an ILE (Integrated Language Environment) operation, i.e., a system call of the i5/OS host operating system, and is being masked to signals from the host operating system. The locking mechanism between the signal-waiter thread and the worker thread protects the operating system process from executing code portions of at least one of the application and the guest operating system in more than one thread of the process at a given point of time.

The method of the present invention can be performed in one computer hardware system, for example IBM® Power® System (System i® model), that is running a host operating system with an embedded guest operating system, for example i5/OS and PASE(AIX), respectively. On the hardware system, system executables of both the host operating system and the guest operating system have been installed. The operating system process of the host operating system is able to run the installed system executables of the guest operating system. The host operating system of the computer hardware system is able to run multiple operating system processes in parallel. The operating system process is program code in execution including a set of resources, such as, pending signals, an address space, global variables, and one or more threads of execution. All the threads are executing code portions of the application and the guest operating system and performing system calls of the host operating system. In the present invention, the primary worker thread of the operating system process is dedicated to executing code portions of the application and the secondary signal-waiter thread is dedicated to handling specific signals from the host operating system to prevent interruption of the flow of execution of the worker thread. Signal queues of the host operating system are used to temporarily hold pending signals. Signals allow explicit communication between threads of one operating system process or between different operating system processes. For implicit communication between the worker thread and the signal-waiter thread, shared data are modified. The contents of this shared data which can be accessed by issuing system calls of the guest operating system or the host operating system or by program code of the guest operating system or the host operating system. To control the flow of execution of the threads of the operating system process in the present invention, the signal-waiter thread either protects the worker thread or allows the worker thread to execute application code portions and system calls of the guest operating system. The shared data can be global variables, which may indicate whether the worker thread is executing code portions of the host operating system or not. For the lock of the worker thread a mutual exclusion lock can be used. Only one of the worker thread and the signal-waiter thread is able to acquire and hold the lock at one point of time, and only the owner of this thread is able to release the mutex lock again. As long as the mutex lock has been acquired by the signal-waiter thread, the worker thread must be waiting to acquire the mutex lock until the signal-waiter thread releases the mutex lock.

The present invention can be implemented in a computer program product for execution in a data processing system comprising computer program code portions for performing the steps of the method.

BRIEF DESCRIPTION OF THE DRAWINGS

The present invention is illustrated by way of example and is not limited by the shape of the figures in which.

DETAILED DESCRIPTION

Figure 1:
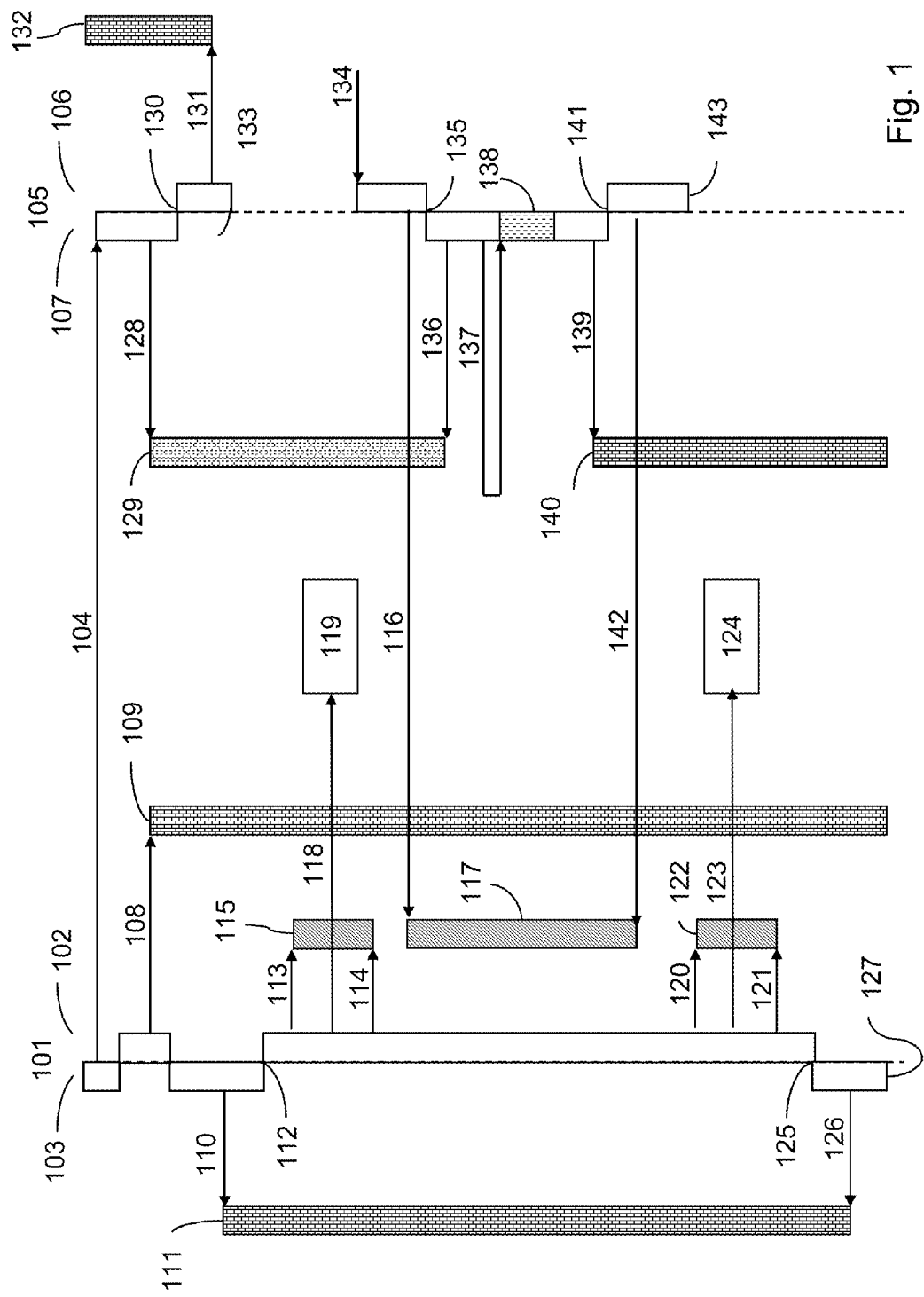
FIG. 1 is a schematic block diagram representation of the signal handling of a process while the worker thread is executing a system call of the host operating system according to the present invention.

In the drawings and specification there has been set forth a preferred embodiment of the invention and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when being loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The current invention is illustrated based on IBM's i5/OS PASE operating system. Of course any other guest operating system that is embedded in a host operating system could be used instead.

In the preferred embodiment of the present invention, a business application, such as mySAP.com® or SAP® R/3® Enterprise, is running in the PASE (AIX) guest operating system. This application has the requirement of single-threaded processes, which is one of the objectives of the present invention. This means that for a given process at most one thread of the process is expected to execute the application program code or system calls of the guest operating system at any given point in time. It is not a necessary condition, however, that the application running in the guest operating system is single-threaded. The present invention is also compatible with multi-threaded applications.

In FIG. 1, the worker thread (101) is the primary thread of an i5/OS process, which is executing system calls (102) of the i5/OS host operating system and code portions (103) of the application or the PASE (AIX) guest operating system. When the worker thread has been started, it sets (108) a mask (109) to mask itself to signals from the host operating system.

Consider the case that the worker thread is executing code portions of the application or the guest operating system and needs to perform a task that requires resources of the host operating system, which may be a database operation: Firstly, the worker thread sets (110) a mask (111) to mask itself to signals from the guest operating system and branches up (112) to execute code portions of the host operating system by issuing a system call of the host operating system. Furthermore, the host operating system code portions (102) of the worker thread may acquire (113) and release (114) a mutex lock (115) in sequence. Mutex lock is the abbreviation for "mutual exclusion lock." The mutex lock is used in the sense of a "gate mutex," like walking through a gate with open and close. The acquisition of the gate mutex is only possible, when the signal-waiter thread is not blocking (116) the mutex lock (117). In the opposite case, when the signal-waiter thread is blocking the mutex lock (117), the worker thread will be waiting, until the signal-waiter thread releases the mutex lock or the owning signal-waiter thread ends abnormally. The worker thread may set (118) a state (119) to indicate execution in the host operating system. When the worker thread has completed the system call of the host operating system, the worker thread acquires (120) and releases (121) the gate mutex (122) provided that the gate mutex (117) has not been acquired (116) by the signal-waiter thread. As described above, when the signal-waiter thread is blocking the mutex lock (117), the worker thread will be waiting, until the signal-waiter thread releases the mutex lock or the owning signal-waiter thread ends abnormally. The numerals (115,117,122) refer to the same gate mutex. If the worker thread sets the state (119) to indicate execution in the host operating system before processing program code in the host operating system, it will unset (123) the same state (124) to indicate execution not in the host operating system and branch back (125) from host operating system code portions to code portions of the application or the guest operating system. The numerals (119, 124) refer to the same state indicating execution of the worker thread in either code portions of the application or of the guest operating system or in code portions of the host operating system. Finally, the worker thread unsets (126) the mask (111) to unmask itself to signals from the guest operating system and continues (127) to execute code portions of the application or of the guest operating system.

When the worker thread is started or before executing code portions of the host operating system for the first time, for example, before the first database activity, which may be the load of the database driver or the first database connect, the worker thread starts (104) a secondary thread (105). The secondary thread (105) is also executing both system calls (106) of the i5/OS host operating system and code portions (107) of the application or the PASE (AIX) guest operating system. The secondary thread sets (128) a mask (129) to mask itself to signals from the guest operating system, branches (130) into the host operating system code portions, unsets (131) the mask (132) to signals from the host operating system, and issues a sigwait( ) command to wait (133) for signals from the host operating system. The secondary thread (105) is called signal-waiter thread, because it is waiting for signals from the host operating system while being masked to signals from the guest operating system.

In the preferred embodiment of the present invention, the SAP business application always sends signals to the i5/OS host operating system. If a second signal is raised by a system call of the PASE (AIX) guest operating system, the signal is remapped onto a specific signal in the host operating system by a system call of the i5/OS host operating system. For example, the PASE (AIX) function kill( ) is remapped onto the i5/OS function kill( ) This is not a requirement, but has the benefit of continuity:

1. Signals initiated by the user from an interactive session are signals of the i5/OS host operating system.
2. In prior art, the environment variable QIBM_MAP_PASE_SIGNALS of the i5/OS host operating system may be set to a specific value (uppercase character "I"). Thus, while the worker thread is executing a system call of the i5/OS host operating system for a non-masked operation, for example, a socket I/O operation, and when a specific signal is raised from the i5/OS host operating system, the i5/OS host operating system automatically maps the signal from the i5/OS host operating system onto the corresponding signal of the PASE (AIX) guest operating system, which can handle the signal immediately irregardless of the worker thread being masked to signals from the guest operating system.
3. Signals can be sent from the PASE (AIX) guest operating system to another i5/OS process irregardless of the destination process having started an embedded PASE (AIX) guest operating system. An i5/OS PASE application sending a signal to another i5/OS process does not need to know what type of application (pure i5/OS or i5/OS PASE) it is sending the signal to if all signals are i5/OS host operating system signals.

When the host operating system receives a signal to be sent to the operating system process, the signal-waiter thread (105) of the process catches (134) the signal because the worker thread is masked (109) to signals from the host operating system. The signal-waiter thread has installed its own signal handlers inside the i5/OS host operating system, thus overriding the default signal handler and disabling the effect of the i5/OS PASE environment variable QIBM_PASE_MAP_SIGNALS.

The signal-waiter thread checks if the worker thread is executing a system call of the host operating system or not. To do this, the signal-waiter thread either reads the value of a shared process variable (119), which indicates the state of the worker thread executing a system call of the host operating system, or extracts the call stack of the worker process.

Depending on the state (119) of the worker thread, one of two actions, either A or B, is taken: case A if the worker thread is executing a system call (102) of the host operating system and case B if the worker thread is not executing a system call of the host operating system. In the latter case, the worker thread is executing code portions (103) of one of the application and the guest operating system, where the application is issuing system calls of the guest operating system.

Case A)

While the worker thread is executing a system call (102) of the host operating system, the signal waiter thread acquires (116) the mutex lock (117) in the host operating system using the POSIX command pthread_mutex_lock( ). This function returns only to the caller after the mutex lock has been acquired or when an error occurred. When the mutex is being blocked by another thread, this system call will wait until the mutex has been released. Consider that the worker thread normally acquires (113,120) and releases (114,121) the mutex lock (115,122) when branching (112) from code portions of the application or the guest operating system to code portions of the host operating system or vice versa (125). After having acquired the mutex lock, the signal-waiter thread branches (135) to code portions of the guest operating system, calls the POSIX command pthread_sigmask( ) to unblock itself for signals from the guest operating system, that is, unsets (136) the mask (129) to signals from the guest operating system, and raises (137) an associated signal directly to itself using the POSIX command pthread_kill( ) The signal-waiter thread catches the associated signal and invokes (138) the signal handler of the guest operating system. When the signal handler has completed, the signal-waiter thread masks itself again to signals from the guest operating system, that is, sets (139) the mask (140) to signals from the guest operating system again. Then, the signal-waiter thread branches (141) to the code portions of the host operating system and releases (143) the mutex lock (117) so that the return (125) of the worker thread from code portions of the host operating system to code portions of the application or the guest operating system cannot be blocked any more. Finally, the signal-waiter thread continues to wait (143) for signals from the host operating system.

When the signal handler (138) of the SAP business application in the PASE(AIX) guest operating system issued, for example, a request to cancel the database request, the worker thread would end database processing and wait to acquire (120) the mutex lock (122). When the signal-waiter thread releases (142) the same mutex lock (117), the worker thread can acquire (120) and release (121) the mutex lock (122) and then branch back (125) to code portions of the application or the guest operating system. Then, the worker thread could perform a cleanup of resources, rollback to a consistent database save point, and begin to process the next unit of work.

In the preferred embodiment of the present invention, experiment has shown that it is favorable to derive the gate mutex (115,117,122,153) from an i5/OS owner termination mutex (PTHREAD_MUTEX_OWNERTERM_NP). Before the worker thread branches back (125) from code portions of the i5/OS host operating system to code portions of the application or the PASE (AIX) guest operating system, it tries to acquire (120) the gate mutex using the command pthread_mutex_lock( ). The signal-waiter thread, however, may have acquired (116) the same gate mutex (117) while the worker thread was executing a system call of the i5/OS host operating system. If the signal-waiter thread had terminated (155) before the worker thread tried to acquire (152) the gate mutex (153) or while the worker thread was waiting to acquire (152) the gate mutex (153), then, the gate mutex would be orphaned and the attempt to acquire (152) the owner termination mutex would fail with an EOWNERTERM error. This is an indication that the signal-waiter thread has terminated (155), and the primary worker thread would issue (154) the command exit( ) to terminate the whole process. If the worker thread got another error while attempting to obtain the gate mutex, it would also use the command exit( ) to end the i5/OS process abnormally.

Case B)

Figure 2:
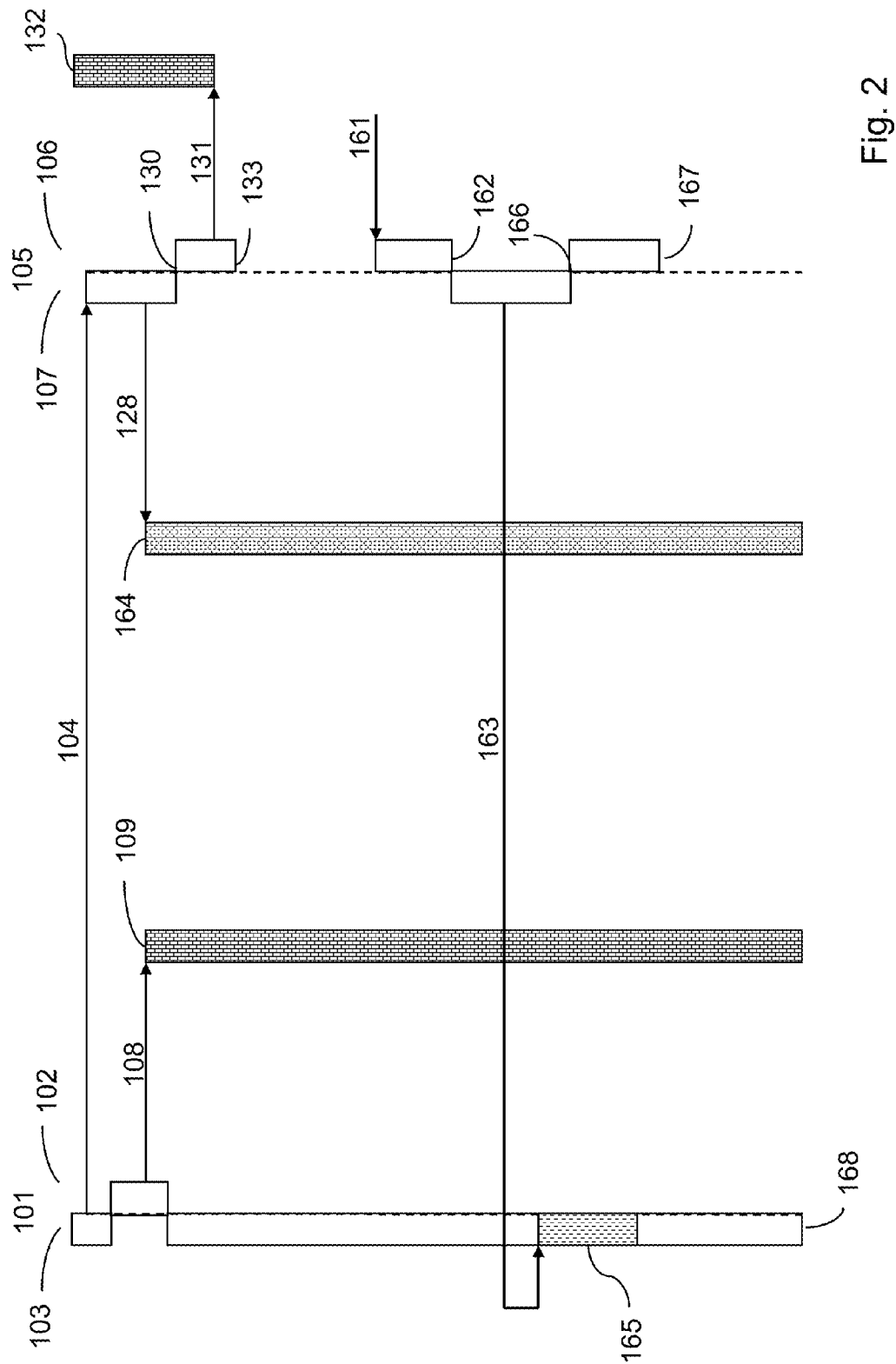
FIG. 2 is a schematic block diagram representation of the signal handling of a process while the worker thread is not executing a system call of the host operating system according to the present invention.

FIG. 2 shows how the signal-waiter thread catches (161) a signal while the worker thread is not busy in the host operating system, this means the worker thread is executing code portions (103) of the application or the guest operating system. In response to the signal (161) from the host operating system, the signal-waiter thread branches (162) to code portions of the guest operating system and broadcasts (163) the command kill( ) in the guest operating system. Since the signal-waiter thread is masked (164) to signals from the guest operating system, only the worker thread, which is executing code portions (103) of the guest operating system, is able to catch the signal and use (165) the signal handler of the guest operating system. After sending the signal, the signal-waiter thread branches (166) back to code portions of the host operating system and waits (167) again for signals from the host operating system. After the worker thread has handled the signal, it continues (168) the previous program code.

Figure 3A:
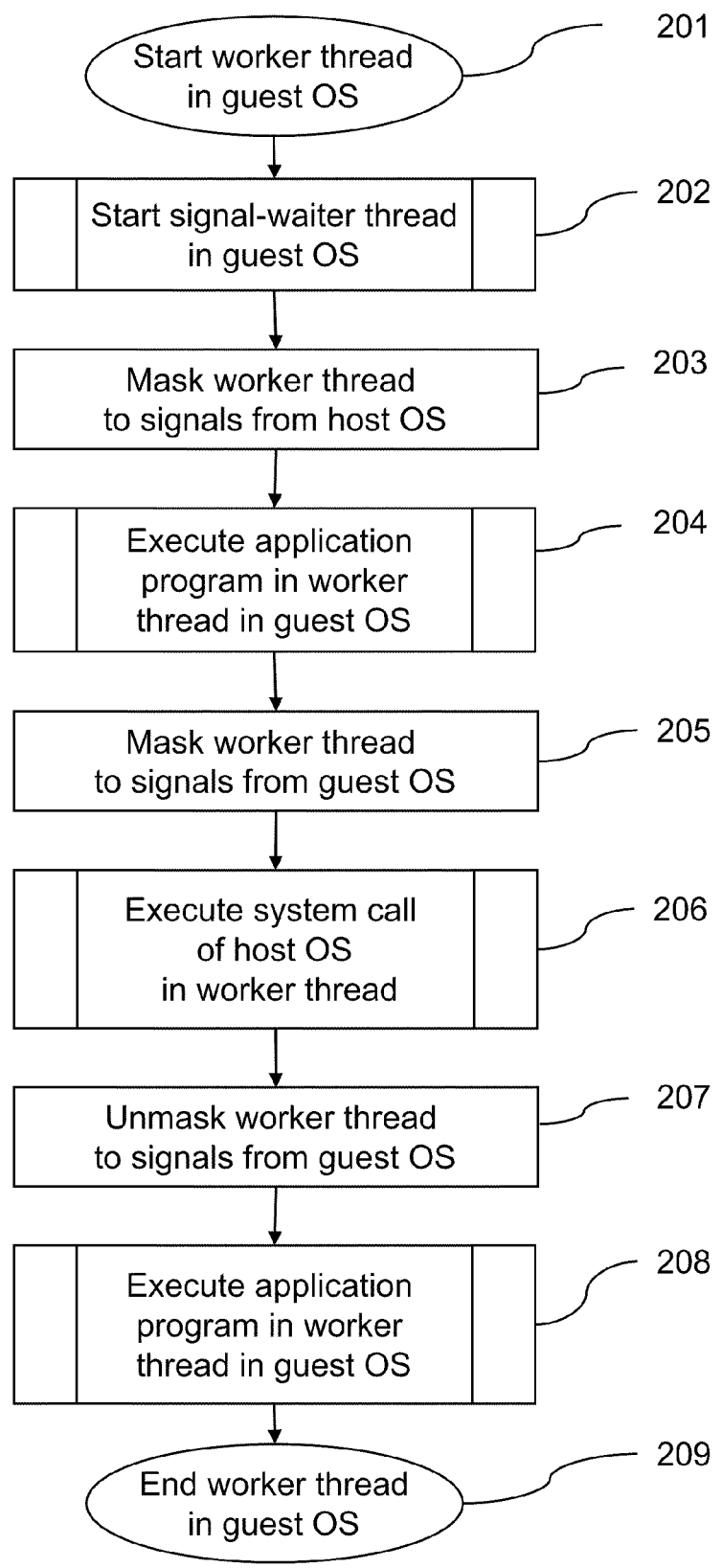
FIGS. 3a to 3c are flow chart representations of the program code execution in the worker thread according to the present invention.
Figure 3C:
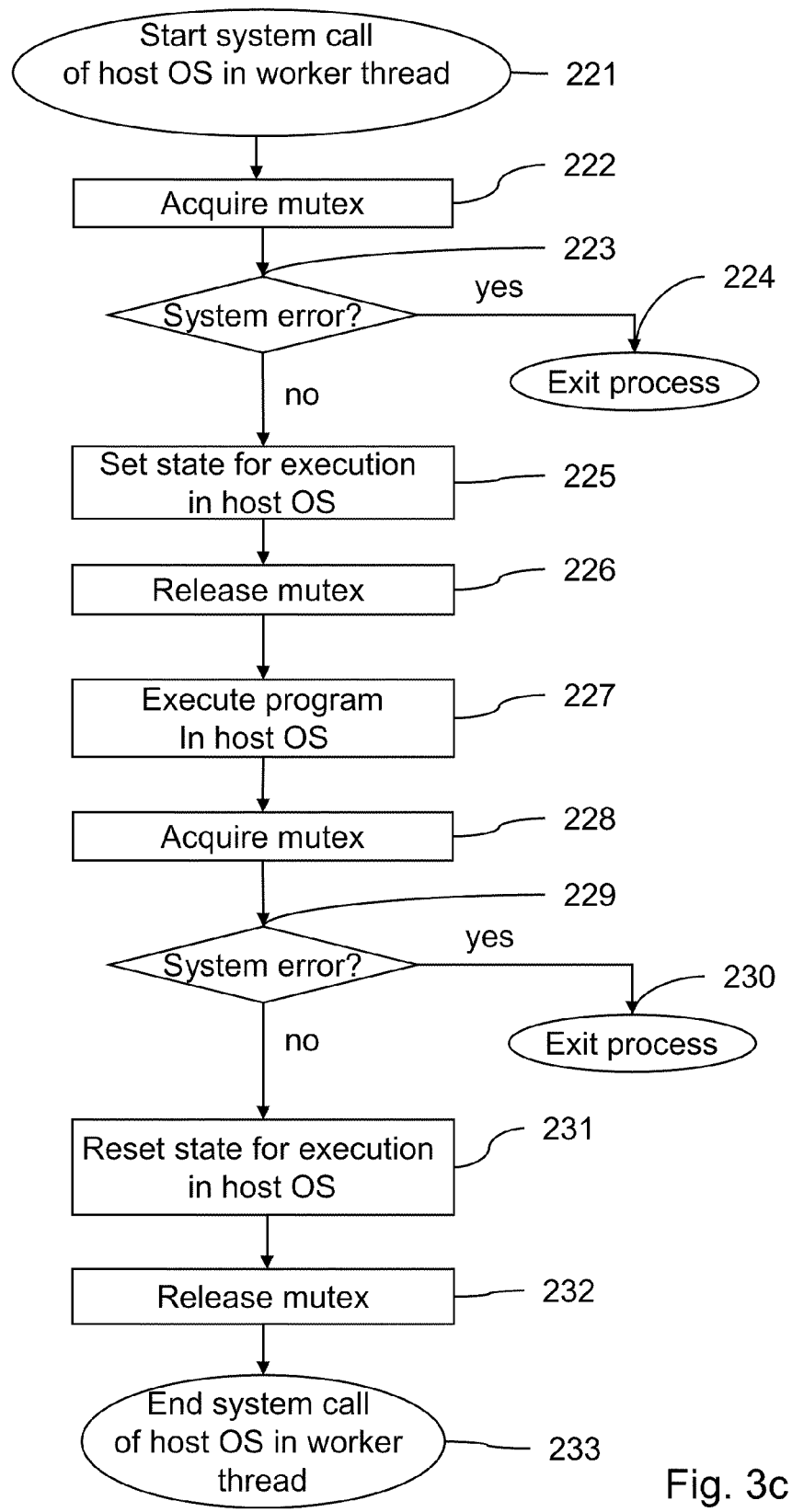
Figure 4A:
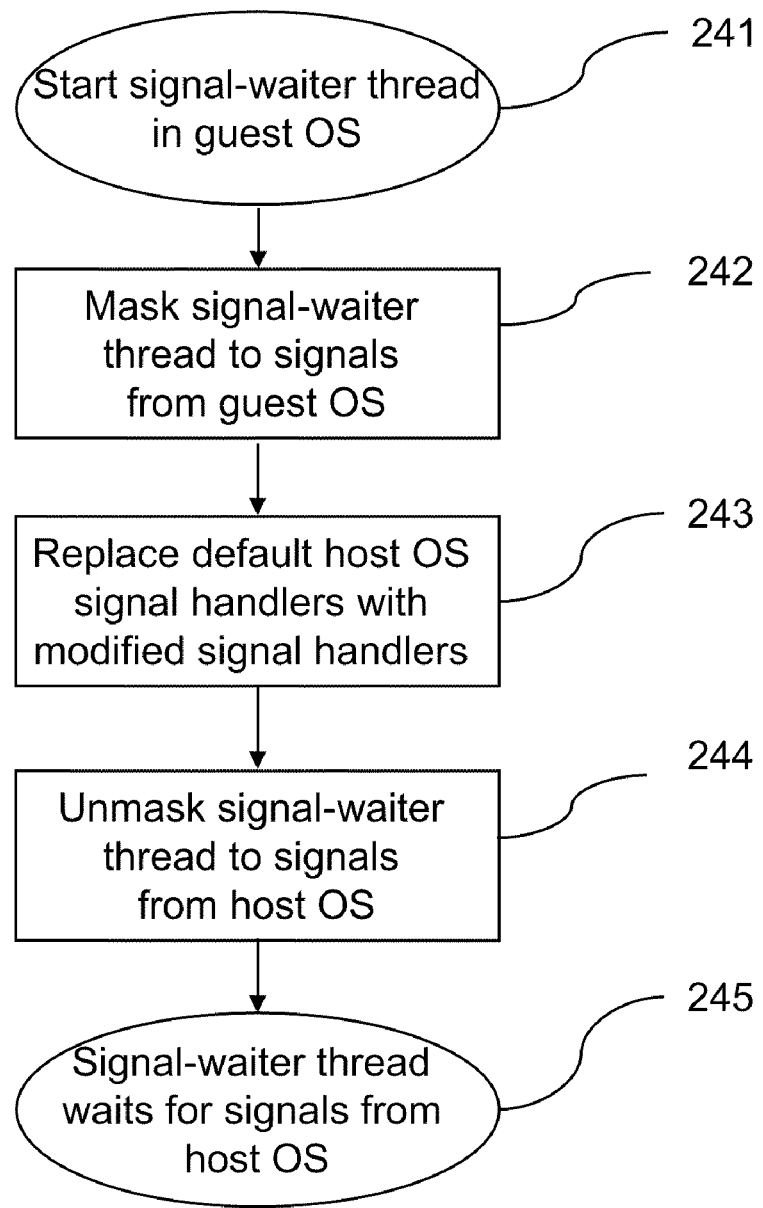
FIGS. 4a to 4e are flow chart representations of the program code execution in the signal-waiter thread according to the present invention.

FIG. 3a shows a flow chart for the start (201) of the worker thread in the guest operating system, which initiates (202) the start of the signal-waiter thread, described in FIG. 4a. The worker thread is masked (203) to signals from the host operating system and executes (204) the application program in the guest operating system, which means execution of program code portions of the application and system calls of the guest operating system. Before the worker thread executes (206) a system call of the host operating system, it masks (205) itself to signals from the guest operating system. According to step (206), FIG. 3c illustrates how the worker thread executes a system call of the host operating system. The worker thread unsets (207) the mask to signals from the guest operating system before it continues to execute (208) the application program in the guest operating system and is terminated (209) by itself or upon request from the operating system.

Figure 3B:
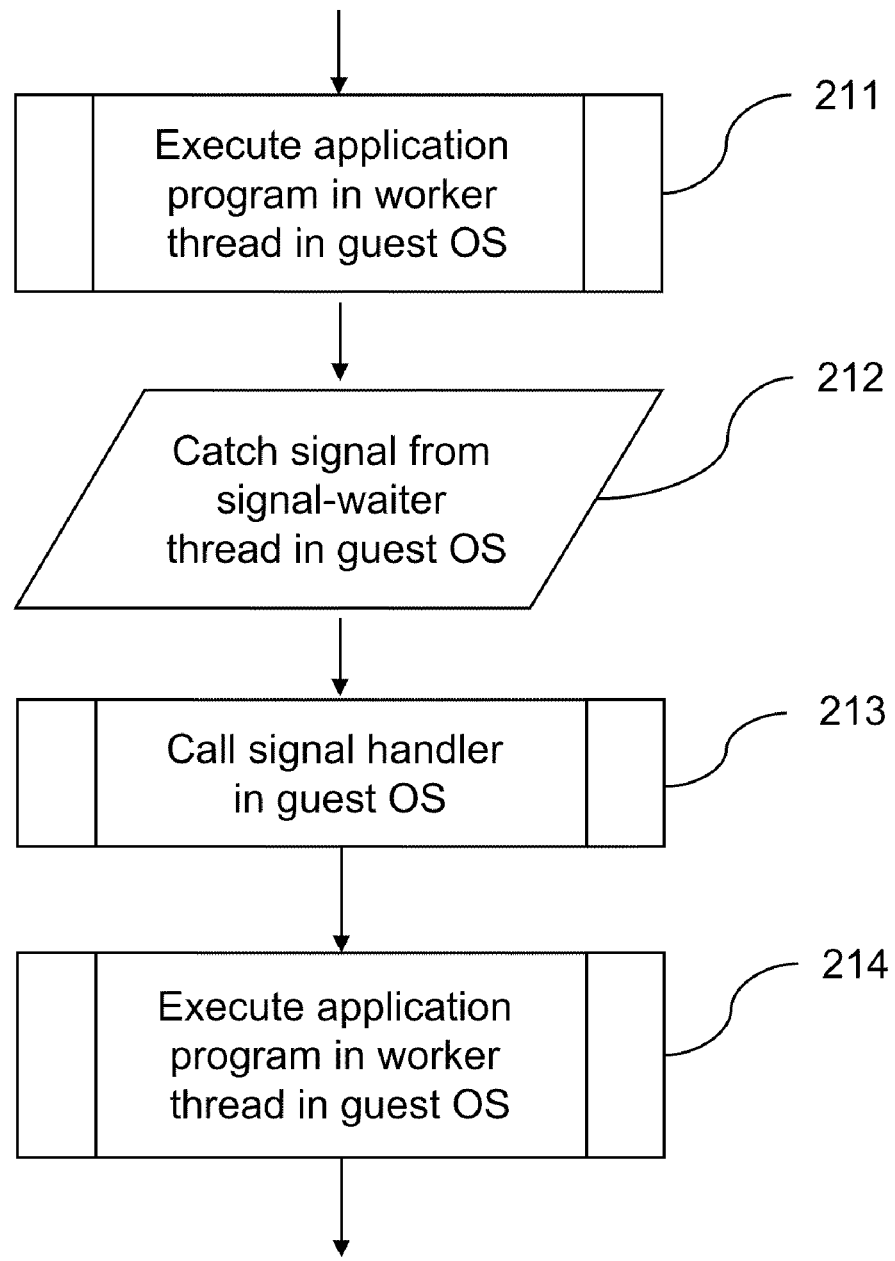

In the flow chart of FIG. 3b, the worker thread is executing (211) the application program in the guest operating system, when, for example, the signal-waiter thread broadcasts a signal in the guest operating system and the worker thread catches (212) the signal from the signal-waiter thread. The worker thread calls (213) the signal handler of the guest operating system before it continues to execute (214) the application program in the guest operating system.

FIG. 3c refers to step (206) of FIG. 3a and depicts a flow chart how the worker thread executes a system call of the host operating system. After the worker thread branched (221) from guest operating system code portions to host operating system code portions, the worker thread tries (222) to acquire the mutex (115) shown in FIG. 1. It may happen that the signal-waiter thread ended abnormally while owning the same mutex (117), confer FIG. 1. When the worker thread tries to acquire this orphaned mutex, a system error (223) occurs. The system error could also have other reasons. In case of the system error (223, "yes" branch), the worker thread issues (224) an exit( ) command to terminate the whole process. When no system error occurs (223, "no" branch) and the mutex is not free because the signal-waiter thread has acquired the same mutex, the worker thread is waiting until the mutex can be acquired (222). Then, the worker thread sets (225) the state to indicate execution in the host operating system, and releases (226) the mutex again. The worker thread continues to execute (227) the program code in the host operating system. Before branching back (233) to the guest operating system, the worker thread tries (228) to acquire the mutex again. When a system error (229, "yes" branch) occurs for the reasons described above, the worker thread issues (230) an exit( ) command to terminate the whole process. When no system error occurs (229, "no" branch) and the mutex is not free because the signal-waiter thread has acquired the same mutex, the worker thread is waiting until the mutex can be acquired (228). Then, the worker thread resets (231) the state that indicated execution in the host operating system to indicate execution in the guest operating system and releases (232) the mutex.

The flow chart in FIG. 4a describes how the signal-waiter thread is started (241) and masks (242) itself to signals from the guest operating system. The signal-waiter thread branches up to code portions of the host operating system and replaces (243) the default host operating system signal handler with the modified signal handler of the preferred embodiment. The signal-waiter thread unmasks (244) itself to signals from the host operating system and is waiting (245) for signals from the host operating system. The waiting state (245) of the signal-waiter thread is the starting state (251,261) of the following flow charts presented in FIGS. 4b and 4c, respectively.

Figure 4B:
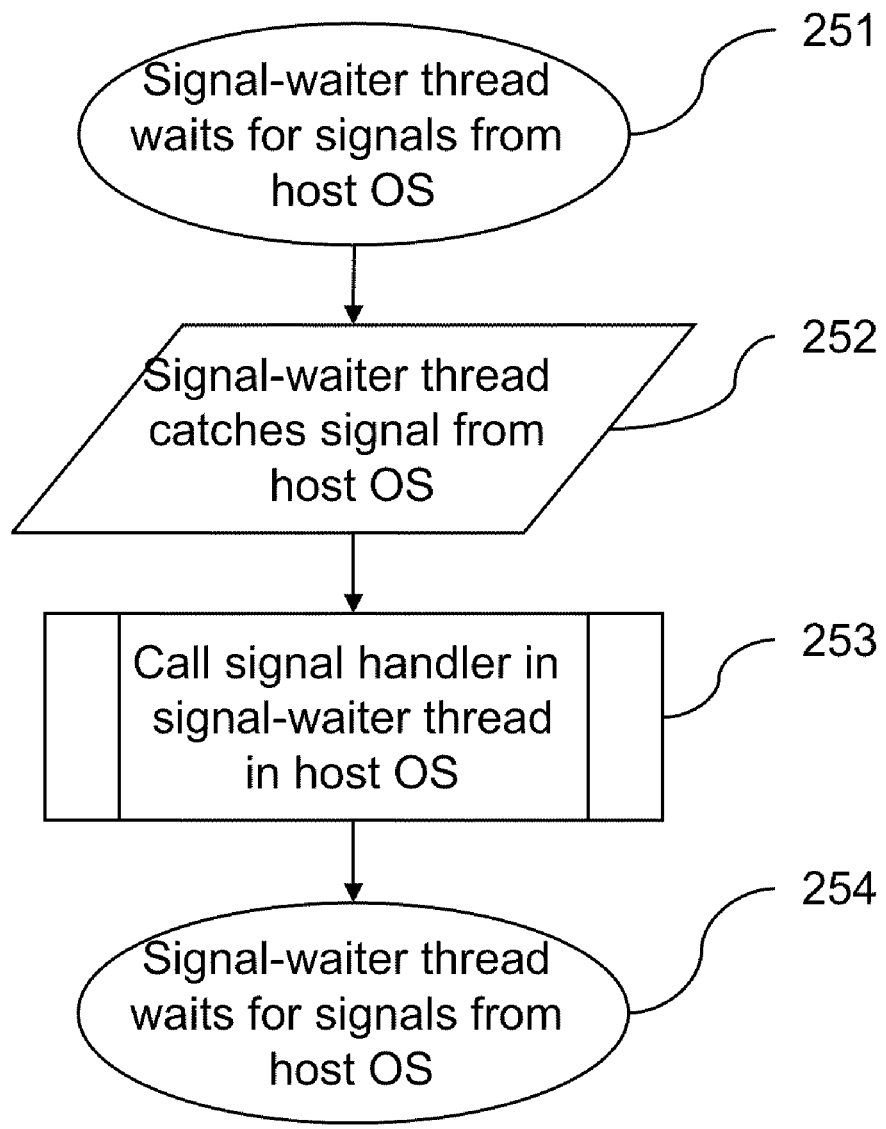

FIG. 4b shows the flow chart how the signal-waiter thread is waiting (251) for signals from the host operating system. The signal-waiter thread may catch (252) a signal from the host operating system and call (253) the modified signal handler of the host operating system as described in FIG. 4d before the signal-waiter thread continues waiting (254) for signals from the host operating system.

Figure 4C:
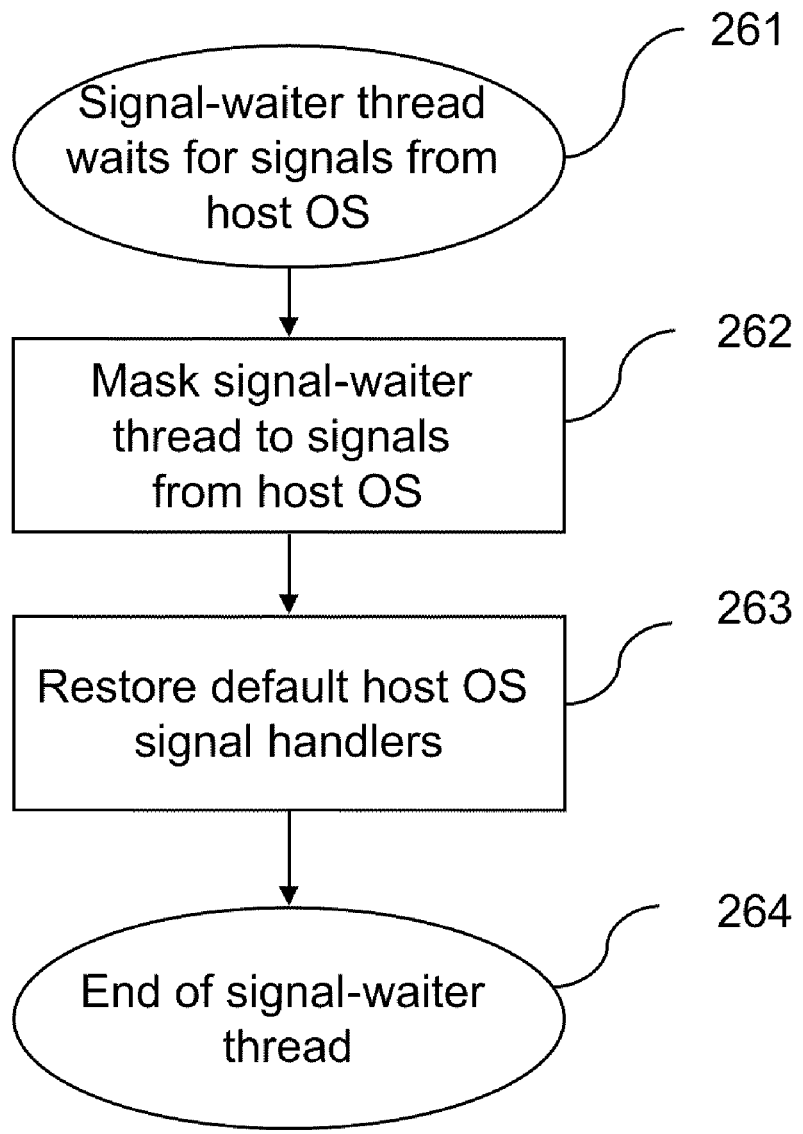

The flow chart of FIG. 4c shows the steps of the signal-waiter thread before termination (264): Starting from the state waiting (261) for signals from the host operating system, the signal-waiter thread masks (262) itself to signals from the host operating system and restores (263) the default host operating system signal handlers.

Figure 4D:
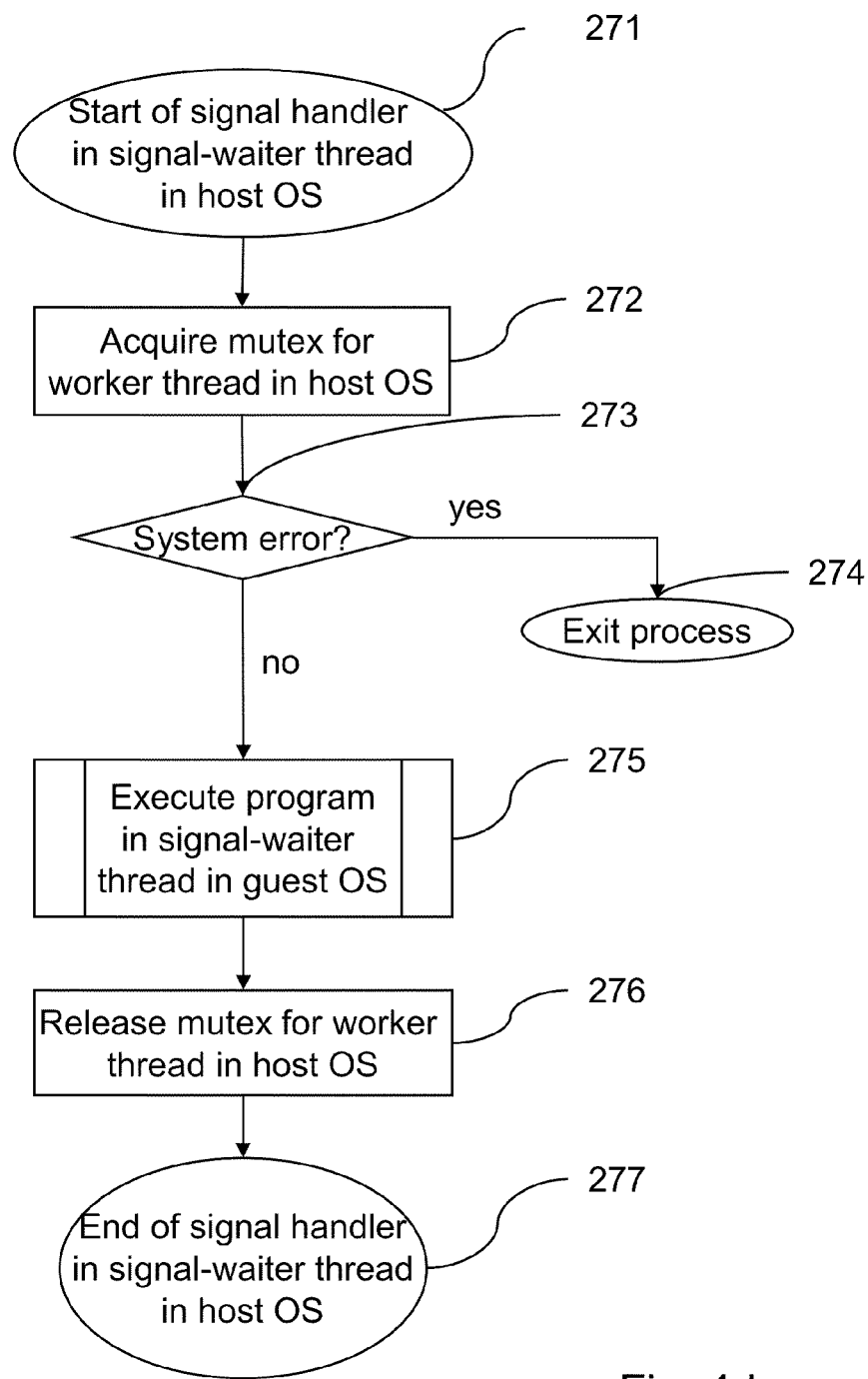
Figure 4E:
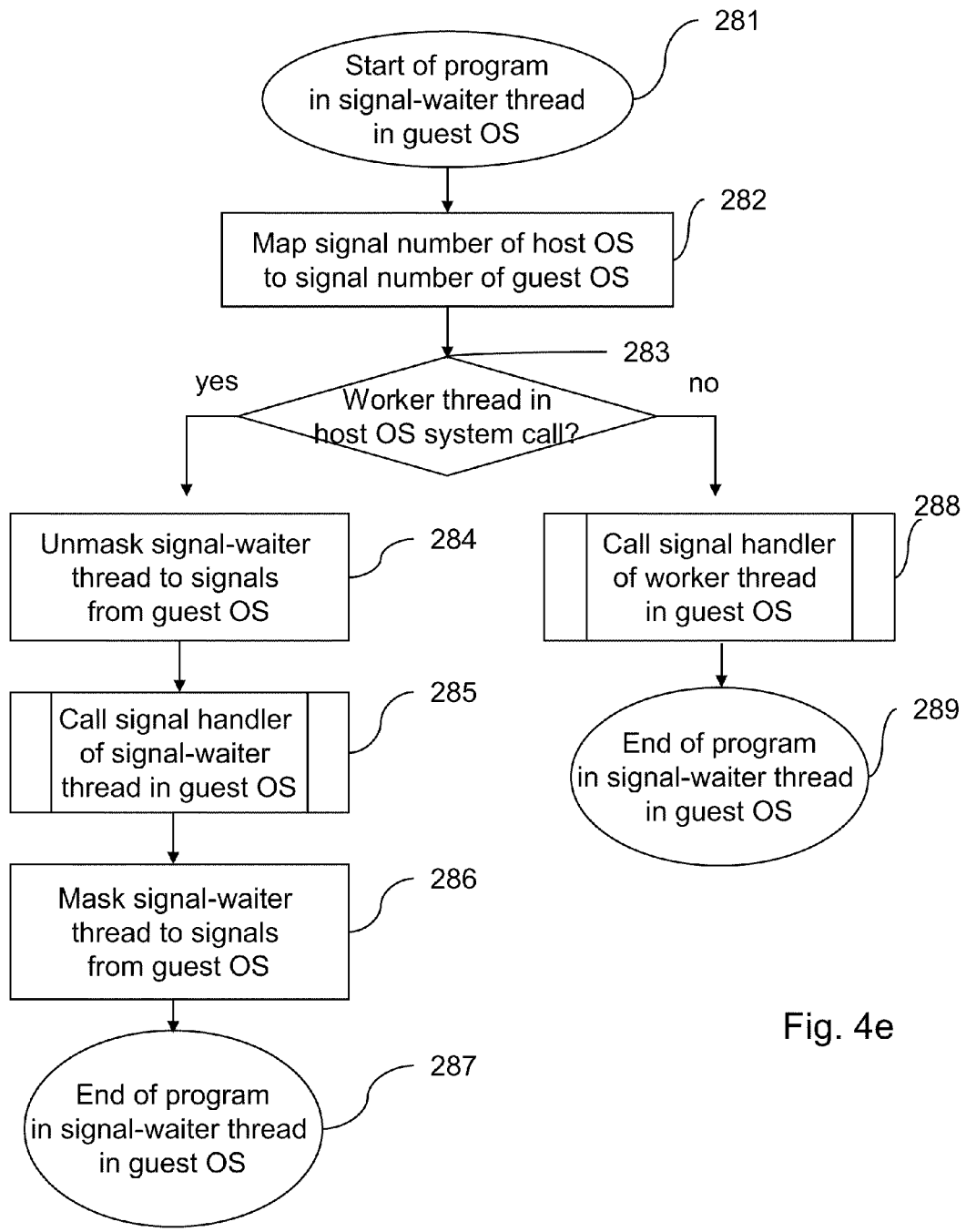

FIG. 4d refers to step (253) of FIG. 4b and the flow chart depicts the steps of the signal handler for the signal-waiter thread in the host operating system. When the signal-waiter thread calls (271) the signal handler in the host operating system, the signal-waiter thread tries (272) to acquire the mutex (117) for the worker thread shown in FIG. 1. This is the same mutex (115,122) that the worker thread acquires (113, 120) and releases (114,121) at the start and end of a system call of the host operating system. In case of a system error (273, "yes" branch), the signal-waiter thread issues (274) an exit( ) command to terminate the whole process. When no system error occurs (273, "no" branch) and the mutex is not free because the worker thread has acquired the same mutex, the signal-waiter is waiting until the mutex is free and can be acquired (272). Then, the signal-waiter thread executes (275) the program code portions of the signal-waiter thread in the guest operating system to handle a specific caught signal from the host operating system, which are shown in FIG. 4e, and releases (276) the mutex for the worker thread in the host operating system. The signal handler has finished (277) the step (253) of FIG. 4b in the host operating system.

FIG. 4e refers to the step (275) of FIG. 4d and shows a flow chart of the signal-waiter thread executing program code of the signal-waiter thread in the guest operating system invoked by the signal handler of the host operating system. The signal-waiter thread branches (281) to code portions of the guest operating system, maps (282) the signal number of the caught signal from the host operating system onto an adapted signal number of the guest operating system, and checks (283) if the worker thread is executing a system call of the host operating system. If the answer of the check (283) is "yes", the signal-waiter thread unmasks (284) itself to signals from the guest operating system and redirects (285) an associated signal to itself, thus calling the signal handler of the guest operating system. The associated signal is adapted to the specific signal from the host operating system. When the signal-waiter thread has finished processing the signal handler of the guest operating, the signal-waiter thread sets (286) the mask to signals from the guest operating system again.

When the worker thread is not executing a system call of the host operating system (283, answer "no"), the worker thread broadcasts a signal to the operating system process, thus invoking (288) the signal handler of the guest operating system in the worker thread. After the signal-waiter thread has completed the steps in both branches of decision point (283), the signal-waiter thread returns (287, 289) to code portions of the host operating system.

As stated above, the present invention is compatible with multi-threaded applications. A multi-threaded application could consist of a primary application thread dedicated to executing application code portions and a secondary application thread dedicated to handling signals from the guest operating system. The primary application thread would always be masked to signals from the guest operating system.

In the preferred embodiment, the invention could be implemented in shared library code of a database driver. In this case, it would be not trivial to determine whether the application using the invention were single-threaded or multi-threaded. It would be impossible to detect whether such a multi-threaded application were able to handle a signal in the secondary application thread other than the primary application thread.

According to the present invention, the primary application thread starts a secondary signal-waiter thread dedicated to handling specific signals from the host operating system before the primary application thread executes a system call of the host operating system for the first time.

In case A, while the primary application thread is executing a system call of the host operating system, the secondary signal-waiter thread handles a specific signal from the host operating system and protects the primary application thread from executing code portions of the application and of the guest operating system.

In case B, while the primary application thread is executing code portions of the application or of the guest operating system, the secondary signal-waiter thread broadcasts a second signal in the guest operating system by issuing the command kill( ) where the second signal is adapted to the specific caught signal from the host operating system. Since the primary application thread and the created secondary signal-waiter thread are both masked to signals from the guest operating system, the secondary application thread is the only thread to catch and handle the broadcasted second signal from the secondary signal-waiter thread.

When the operating system process comprised more than one worker thread, each of the worker threads could process certain tasks. Each of the worker threads would have a dedicated signal-waiter thread. The signal-waiter threads would be assigned to handle signals for the corresponding worker threads of the process. Thus, the present invention is also compatible with multi-threaded applications.

In the preferred embodiment of the present invention, the system call of the host operating system is typically executing a database operation on the built-in database system. Since the database system, DB2 for i5/OS, is integrated in the i5/OS host operating system, the system call to the native database is a blocking call as follows: A system call from the guest operating system to the host operating system (via the PASE application programming interface_ILECALL( ) or_PGM-CALL( )) blocks the calling worker thread from external signals sent from the guest operating system to the operating system process. A system call from within the host operating system to the integrated i5/OS database system is a blocking system call in the host operating system. Therefore, the worker thread of the operating system process is masked to signals from the host operating system and from the guest operating system.

The database system can also reside on a remote computer system host, which is connected with the local computer system host by a network. Then, the system call uses I/O sockets and is not blocking. The calling worker thread could be interrupted.

To guarantee signal delivery from a second guest operating system process, a signal should be mapped to a corresponding specific signal of the host operating system and sent by way of the host operating system. Then, the signal-waiter thread of the first operating system process is the only thread to catch and process the specific caught signal from the host operating system.

The present invention is not restricted to database operations and can be applied to any masked or non-masked operations, which correspond to blocking or non-blocking system calls of the host operating system.

In a first alternative embodiment of the present invention, an application program could directly issue a signal to the guest operating system.

The case A, while the worker thread is executing a system call of the host operating system and is masked to signals from the guest operating system, would then require a second signal-waiter thread. The second signal-waiter thread would be masked to signals from the host operating system and waiting for signals from the guest operating system. When the second signal-waiter thread caught a first signal from the guest operating system, it would branch up into the host operating system and broadcast a corresponding second signal in the host operating system. The second signal would be handled by the first signal-waiter-thread as described in the preferred embodiment of the present invention.

In case B, while the worker thread is not executing a system call of the host operating system, the second signal-waiter thread or the worker thread that are both unmasked to signals from the guest operating system could directly catch the first signal from the guest operating system. The first signal-waiter thread, however, is masked to signals from the guest operating system and is only waiting for signals from the host operating system. When the worker thread caught the first signal from the guest operating system, it would call the signal handler of the guest operating system. When the second signal-waiter thread caught the first signal from the guest operating system, it would branch up into the host operating system and broadcast a corresponding second signal adapted to the first caught signal in the host operating system. The second signal would be handled by the first signal-waiter-thread as described in the preferred embodiment of the present invention, that is, the first signal-waiter thread sends a third signal in the guest operating system adapted to the caught second signal to the worker thread. The only difference is that in the first alternative embodiment the first signal-waiter-thread would issue a pthread_kill( ) in the guest operating system directly to the worker thread in the case where it would have issued a kill( ) in the preferred embodiment. This prevents any recursion in the first alternative embodiment that would result if the second signal-waiter-thread saw the third signal from the first signal-waiter thread again.

In a second alternative embodiment of the invention, the operating system process would have multiple worker threads supporting a multi-threaded application. The operating system process would only have one dedicated signal-waiter thread to handle all the signals from the host operating system and control the lock mechanisms of all the worker threads of the operating system process.

Thus, the present invention allows for almost immediate, i.e., real-time, handling of signals independent of the worker thread executing code portions of the application or the guest operating system or a system call of the host operating system in a masked or non-masked operation.

What is claimed:

1. A method comprising,
   providing an operating system process, the operating system process executing application code portions, system calls of a host operating system, and system calls of a guest operating system, the guest operating system being embedded in the host operating system, the operating system process comprising a worker thread dedicated to executing the application code portions such that when started the worker thread creates an associated signal-waiter thread dedicated to handling specific signals from the host operating system and the worker thread being masked to signals from the host operating system to the operating system process to prevent interruption of the flow of execution of the worker thread; and,
   catching a specific signal of the signal-waiter thread from the host operating system, the catching further comprising
   in response to the specific caught signal while the worker thread is executing a system call of the host operating system, the signal-waiter thread protecting the worker thread from executing application code portions and system calls of the guest operating system,
   the signal-waiter thread executing code portions for handling signals from the guest operating system adapted to the specific signal from the host operating system, and,
   the signal-waiter thread allowing the worker thread to execute application code portions and system calls of the guest operating system after the signal-waiter thread has finished handling the specific signal; and wherein
   the signal-waiter thread is protecting the worker thread from executing application code portions and system calls of the guest operating system by acquiring a mutex lock, the signal-waiter thread is allowing the worker thread to execute application code portions and system calls of the guest operating system by releasing the mutex lock, the error handling performed by the worker thread is triggered when the worker thread fails to acquire the mutex lock because the signal-waiter thread has ended abnormally while owning the mutex lock.

2. The method according to claim 1, wherein the worker thread performs error handling when the signal-waiter thread ended abnormally and does not allow the worker thread to execute application code portions and system calls of the guest operating system.

3. The method according to claim 2, wherein the error handling performed by the worker thread comprises terminating the operating system process.

4. The method according to claim 1, wherein the worker thread is also masked to signals from the guest operating system.

5. The method according to claim 1, further comprising:

A method comprising, providing an operating system process, the operating system process executing application code portions, system calls of a host operating system, and system calls of a guest operating system, the guest operating system being embedded in the host operating system, the operating system process comprising a worker thread dedicated to executing the application code portions such that when started the worker thread creates an associated signal-waiter thread dedicated to handling specific signals from the host operating system and the worker thread being masked to signals from the host operating system to the operating system process to prevent interruption of the flow of execution of the worker thread; and, catching a specific signal of the signal-waiter thread from the host operating system, the catching further comprising in response to the specific caught signal while the worker thread is executing a system call of the host operating system, the signal-waiter thread protecting the worker thread from executing application code portions and system calls of the guest operating system, the signal-waiter thread executing code portions for handling signals from the guest operating system adapted to the specific signal from the host operating system, and the signal-waiter thread allowing the worker thread to execute application code portions and system calls of the guest operating system after the signal-waiter thread has finished handling the specific signal;

in response to the specific caught signal and while the worker thread is not executing a system call of the host operating system and the worker thread is not masked to signals from the guest operating system, and, the signal-waiter thread invoking the worker thread to execute code portions for handling signals from the guest operating system adapted to the specific signal.

6. The method according to claim 1, wherein a second operating system process is executing a system call of the guest operating system to send a signal to the first operating system process, and then the guest operating system is executing a system call of the host operating system to send the specific signal, which is adapted to the signal from the second operating system process, to first the operating system process.

7. The method according to claim 1, wherein the system call of the host operating system is performing a database operation.

8. A system comprising, a processor;

a data bus coupled to the processor; and, a computer usable medium embodying computer program code, the computer usable medium being coupled to the data bus, the computer program code comprising instructions executable by the processor and configured for:

providing an operating system process, the operating system process executing application code portions, system calls of a host operating system, and system calls of a guest operating system, the guest operating system being embedded in the host operating system, the operating system process comprising a worker thread dedicated to executing the application code portions such that when started the worker thread creates an associated signal-waiter thread dedicated to handling specific signals from the host operating system and the worker thread being masked to signals from the host operating system to the operating system process to prevent interruption of the flow of execution of the worker thread; and, catching a specific signal of the signal-waiter thread from the host operating system, the catching further comprising in response to the specific caught signal while the worker thread is executing a system call of the host operating system, the signal-waiter thread protecting the worker thread from executing application code portions and system calls of the guest operating system, the signal-waiter thread executing code portions for handling signals from the guest operating system adapted to the specific signal from the host operating system, and, the signal-waiter thread allowing the worker thread to execute application code portions and system calls of the guest operating system after the signal-waiter thread has finished handling the specific signal; and wherein the signal-waiter thread is protecting the worker thread from executing application code portions and system calls of the guest operating system by acquiring a mutex lock, the signal-waiter thread is allowing the worker thread to execute application code portions and system calls of the guest operating system by releasing the mutex lock, the error handling performed by the worker thread is triggered when the worker thread fails to acquire the mutex lock because the signal-waiter thread has ended abnormally while owning the mutex lock.

9. The system according to claim 8, wherein the worker thread performs error handling when the signal-waiter thread ended abnormally and does not allow the worker thread to execute application code portions and system calls of the guest operating system.

10. The system according to claim 9, wherein the error handling performed by the worker thread comprises terminating the operating system process.

11. The system according to claim 8, wherein the worker thread is also masked to signals from the guest operating system.

12. A system comprising, a processor;

a data bus coupled to the processor; and, a computer usable medium embodying computer program code, the computer usable medium being coupled to the data bus, the computer program code comprising instructions executable by the processor and configured for:

providing an operating system process, the operating system process executing application code portions, system calls of a host operating system, and system calls of a guest operating system, the guest operating system being embedded in the host operating system, the operating system process comprising a worker thread dedicated to executing the application code portions such that when started the worker thread creates an associated signal-waiter thread dedicated to handling specific signals from the host operating system and the worker thread being masked to signals from the host operating system to the operating system process to prevent interruption of the flow of execution of the worker thread; and, catching a specific signal of the signal-waiter thread from the host operating system, the catching further comprising in response to the specific caught signal while the worker thread is executing a system call of the host operating system, the signal-waiter thread protecting the worker thread from executing application code portions and system calls of the guest operating system, the signal-waiter thread executing code portions for handling signals from the guest operating system adapted to the specific signal from the host operating system;

the signal-waiter thread allowing the worker thread to execute application code portions and system calls of the guest operating system after the signal-waiter thread has finished handling the specific signal;

in response to the specific caught signal and while the worker thread is not executing a system call of the host operating system and the worker thread is not masked to signals from the guest operating system, the signal-waiter thread invoking the worker thread to execute code portions for handling signals from the guest operating system adapted to the specific signal.

13. The system according to claim 8, wherein a second operating system process is executing a system call of the guest operating system to send a signal to the first operating system process, and then the guest operating system is executing a system call of the host operating system to send the specific signal, which is adapted to the signal from the second operating system process, to first the operating system process.

14. The system according to claim 8, wherein the system call of the host operating system is performing a database operation.

* * * * *